(12) United States Patent
Azmy

(10) Patent No.: US 11,133,974 B2
(45) Date of Patent: Sep. 28, 2021

(54) OMNI-CHANNEL ELECTRONIC COMMUNICATION SYSTEM AND METHOD

(71) Applicant: eBusiness Solutions Enabling Group—eBSEG Inc., Toronto (CA)

(72) Inventor: Mohamed Mahmoud Azmy, Cairo (EG)

(73) Assignee: eBusiness Solutions Enabling Group—eBSEG Inc., Toronto (CA)

( * ) Notice: Subject to any disclaimer, the term of this patent is extended or adjusted under 35 U.S.C. 154(b) by 0 days.

(21) Appl. No.: 15/722,116

(22) Filed: Oct. 2, 2017

(65) Prior Publication Data

US 2018/0123858 A1 May 3, 2018

Related U.S. Application Data

(60) Provisional application No. 62/416,514, filed on Nov. 2, 2016.

(51) Int. Cl.
*H04L 29/06* (2006.01)
*H04W 88/06* (2009.01)
*H04M 15/00* (2006.01)
*H04L 12/54* (2013.01)
(Continued)

(52) U.S. Cl.
CPC ............... *H04L 29/06* (2013.01); *G06F 8/38* (2013.01); *H04L 12/5692* (2013.01); *H04L 69/14* (2013.01); *H04L 69/18* (2013.01); *H04M 15/70* (2013.01); *H04M 15/71* (2013.01); *H04M 15/72* (2013.01); *H04M 15/721* (2013.01); *H04M 15/723* (2013.01); *H04M 15/8207* (2013.01); *H04M 15/83* (2013.01); *H04M 15/84* (2013.01); *H04M 15/846* (2013.01);
(Continued)

(58) Field of Classification Search
CPC ....... H04L 29/06; H04L 12/5692; G06F 8/38; H04M 15/8207; H04W 88/06
See application file for complete search history.

(56) References Cited

U.S. PATENT DOCUMENTS

2007/0100748 A1* 5/2007 Dheer .................... G06Q 20/10
705/39
2012/0290914 A1* 11/2012 Lee ......................... G06F 9/541
715/234

(Continued)

*Primary Examiner* — Angie Badawi
(74) *Attorney, Agent, or Firm* — Perry + Currier Inc.

(57) ABSTRACT

There is provided a method of providing a multi-channel electronic communication capability allowing a provider to communicate with a plurality of end user terminals corresponding to a plurality of terminal platforms. The method comprises: providing a repository of mini applications being executable on all of the plurality of the terminal platforms. A function and an appearance of the mini applications is editable by the provider. The mini applications are configured to be stored and executed on the end user terminals. The method also comprises providing a WYSIWYG layout editor engine in communication with the repository. The layout editor engine is configured to allow the provider to build a communication interface corresponding to each of the plurality of terminal platforms. The building the communication interface comprises, for each terminal platform: selecting one or more mini applications from the repository, and arranging a layout of the selected mini applications.

10 Claims, 9 Drawing Sheets

(51) Int. Cl.
 *G06F 8/38* (2018.01)
 *H04L 29/08* (2006.01)
(52) U.S. Cl.
 CPC ............ *H04W 88/06* (2013.01); *H04L 67/34*
 (2013.01); *H04M 15/848* (2013.01)

(56) References Cited

U.S. PATENT DOCUMENTS

| | | | |
|---|---|---|---|
| 2013/0179761 A1* | 7/2013 | Cho .................... | G06F 17/2235 |
| | | | 715/202 |
| 2014/0282399 A1* | 9/2014 | Gorelik ..................... | G06F 8/71 |
| | | | 717/122 |
| 2016/0098250 A1* | 4/2016 | Gross ........................ | G06F 8/34 |
| | | | 717/109 |
| 2018/0107343 A1* | 4/2018 | Mills ....................... | G06F 8/316 |

\* cited by examiner

OMNI-CHANNEL ELECTRONIC COMMUNICATION SYSTEM AND METHOD

FIELD

The present specification relates to systems and methods for providing multi-channel electronic communication capability, and more specifically to systems and methods for providing omni-channel electronic communication capability.

BACKGROUND

With the advent of digital and/or electronic communication and the rise of social networks as well as internet of things (IoT), there has been a proliferation of the number of communication channels through which providers of goods and services can reach their customers. Examples of these channels include the Internet as accessed through web browsers, mobile applications for different device families, tablet applications for different device families, Kiosks from different vendors, ATMs from different vendors, social networks as accessed through different web browsers and apps, and wearable devices. FIG. 1 shows an exemplary selection of different electronic communication channels. Within each channel, different end user terminal hardware and software specifications further multiply the number of different terminal platforms for which the providers need to create communication interfaces. Building, optimizing, and maintaining a communication interface for each of the many different channels and/or terminal platforms requires a great deal of time, effort, and expense. Furthermore, it is very challenging to have a single unified solution/platform that can address this need using a unified technique or method.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

An aspect of the present specification provides a method of providing a multi-channel electronic communication capability allowing a provider to communicate with a plurality of end user terminals corresponding to a plurality of terminal platforms, the method comprising: providing a repository of mini applications, the mini applications being executable on all of the plurality of the terminal platforms, a function and an appearance of the mini applications being editable by the provider, the mini applications configured to be stored and executed on the end user terminals; and providing a WYSIWYG layout editor engine in communication with the repository, the layout editor engine configured to allow the provider to build a communication interface corresponding to each of the plurality of terminal platforms. The building the communication interface comprises, for each terminal platform: selecting one or more mini applications from the repository; and arranging a layout of the selected mini applications to build the communication interface.

The multi-channel electronic communication capability can comprise an omni-channel electronic communication capability whereby the mini applications can be used to build the communication interfaces executable on all the terminal platforms that support HTML5 and Java Script.

The building the communication interface can further comprise: editing one or more of the appearance and the function of one or more of the selected mini applications, thereby optimizing the communication interface for specifications of each corresponding terminal platform.

The specifications can comprise one or more of: a screen size; and types of input and output interfaces.

The multi-channel electronic communication capability can comprise an opti-channel electronic communication capability, whereby each communication interface is optimized for the corresponding terminal platform.

The method can further comprise providing a channel manager configured to route data messages between the communication interfaces running on the end user terminals and one or more servers of the provider.

The mini applications can comprise basic static content mini applications, connected mini applications configured to automatically make secure calls to the channel manager, and higher level mini applications.

The mini applications can comprise HTML5 markup, CSS Style Sheets, and Java Script code.

The HTML5 markup and the CSS Style Sheets can control the appearance of the mini applications, and the Java Script code can control the function of the mini applications, for each given mini application the Java Script code being the same for all terminal platforms.

The HTML5 markup can comprise field tags configured to be placeholders for data receivable from servers of the provider.

An implementation of the Java Script code for each mini application can be based on requirements of each provider.

The plurality of terminal platforms can comprise terminal platforms corresponding to web browsers, smartphones, tablets, wearable electronics, social media applications, automatic teller machines (ATMs), electronic kiosks, and any other device that supports HTML5.

The communication interface can comprise an interface editor whereby the end user terminal can receive an input via the interface editor to modify one or more of: a selection of the mini applications appearing in the communication interface; a layout of the mini application in the communication interface; and the appearance of one or more of the mini applications in the communication interface.

One or more of the mini applications can be configured to define one or more objects and one or more actions executable in association with one or more of the objects, wherein the mini applications are configured to receive input to select the objects and the actions.

The one or more of the mini applications can comprise a transactions mini application.

The transactions mini application can be configured to automatically select a transaction method based on a selection of one or more of a transaction source and a transaction target and without requiring input from a user.

The building the communication interface can further comprise: selecting, by the provider, a subset of information receivable at the communication interface running on each end user terminal to be cached at the corresponding end user terminal.

The data messages can comprise one or more of encrypted XML and JSON messages.

One or more of the channel manager and the communication interface can further comprise an intelligent automatic updater configured to automatically update one or more of: one or more of the mini applications included in the communication interface; and the layout of the mini applications in the communication interface.

According to another aspect of the present specification there is provided a system for providing a multi-channel electronic communication capability allowing a provider to communicate with a plurality of end user terminals corresponding to a plurality of terminal platforms, the system comprising: a repository of mini applications, the mini applications being executable on all of the plurality of the terminal platforms, a function and an appearance of the mini applications being editable by the provider, the mini applications configured to be stored and executed on the end user terminals; and a WYSIWYG layout editor engine in communication with the repository, the layout editor engine configured to allow the provider to build a communication interface corresponding to each of the plurality of terminal platforms. The building the communication interface comprises, for each terminal platform: selecting one or more mini applications from the repository; and arranging a layout of the selected mini applications to build the communication interface.

BRIEF DESCRIPTION OF THE DRAWINGS

Preferred implementations of the present specification will now be described, by way of example only, with reference to the attached Figures, wherein.

DETAILED DESCRIPTION

Figure 2:
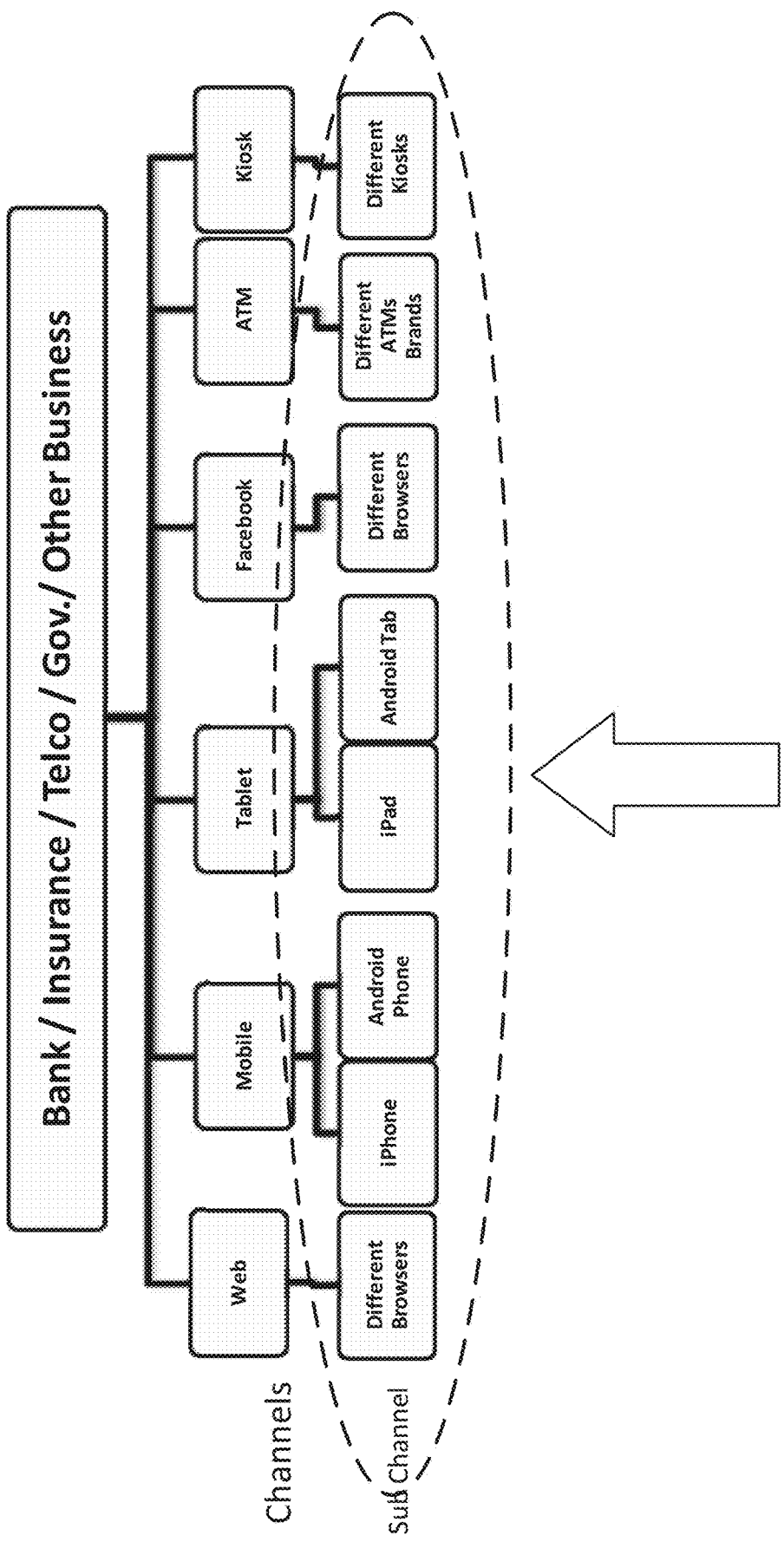
FIG. 2 shows a schematic representation of multi-channel communication through a set of communication channels.

FIG. 2 shows schematically an exemplary multi-channel electronic communication approach that can reduce the time and effort necessary to build, deploy, and maintain communication interfaces for a plurality of electronic communication channels. To address the challenge of providing communication interfaces for the many different electronic communication channels, the present specification provides systems and methods for providing a multi-channel and even omni-channel electronic communication capability allowing a provider to communicate with a plurality of end user terminals corresponding to a plurality of terminal platforms.

For example, an end user terminal can comprise a desktop computer with a desktop web browser running on a Windows™ or any other operating system. As a further example, another end user terminal can comprise a smart phone or tablet running an Android™ or iOS™ operating system. In general, terminal platform can comprise the combination of software elements (e.g. operating system, web browser, social network apps, etc.) and hardware elements (e.g. input and output terminals) that determines whether a given communication interface is executable and correctly operable on a given end user terminal. Examples of end user terminals and corresponding terminal platforms are not limited to those described herein, as would be understood by the skilled person.

To provide such multi-channel electronic communication capability, a repository of mini applications is provided, which mini applications are executable on all of the plurality of the terminal platforms. Moreover, the function and appearance of the mini applications are editable by the provider, and the mini applications are configured to be stored and executed on the end user terminals. In addition, a what-you-see-is-what-you-get (WYSIWYG) layout editor engine is provided which is configured to allow the provider to build a communication interface corresponding to each of the plurality of terminal platforms. Building the communication interface comprises, for each terminal platform: selecting one or more mini applications from the repository, and arranging a layout of the selected mini applications to build the communication interface.

As the same mini applications can be used to build communication interfaces for the different terminal platforms, the process of building, deploying, and maintaining the communication interfaces for the different terminal platforms can become quicker, less expensive, and more efficient. Moreover, the function, appearance, and/or layout of the mini applications can be edited to optimize each communication interface for its respective terminal platform, thereby providing and opti-channel electronic communication capability.

Figure 3:
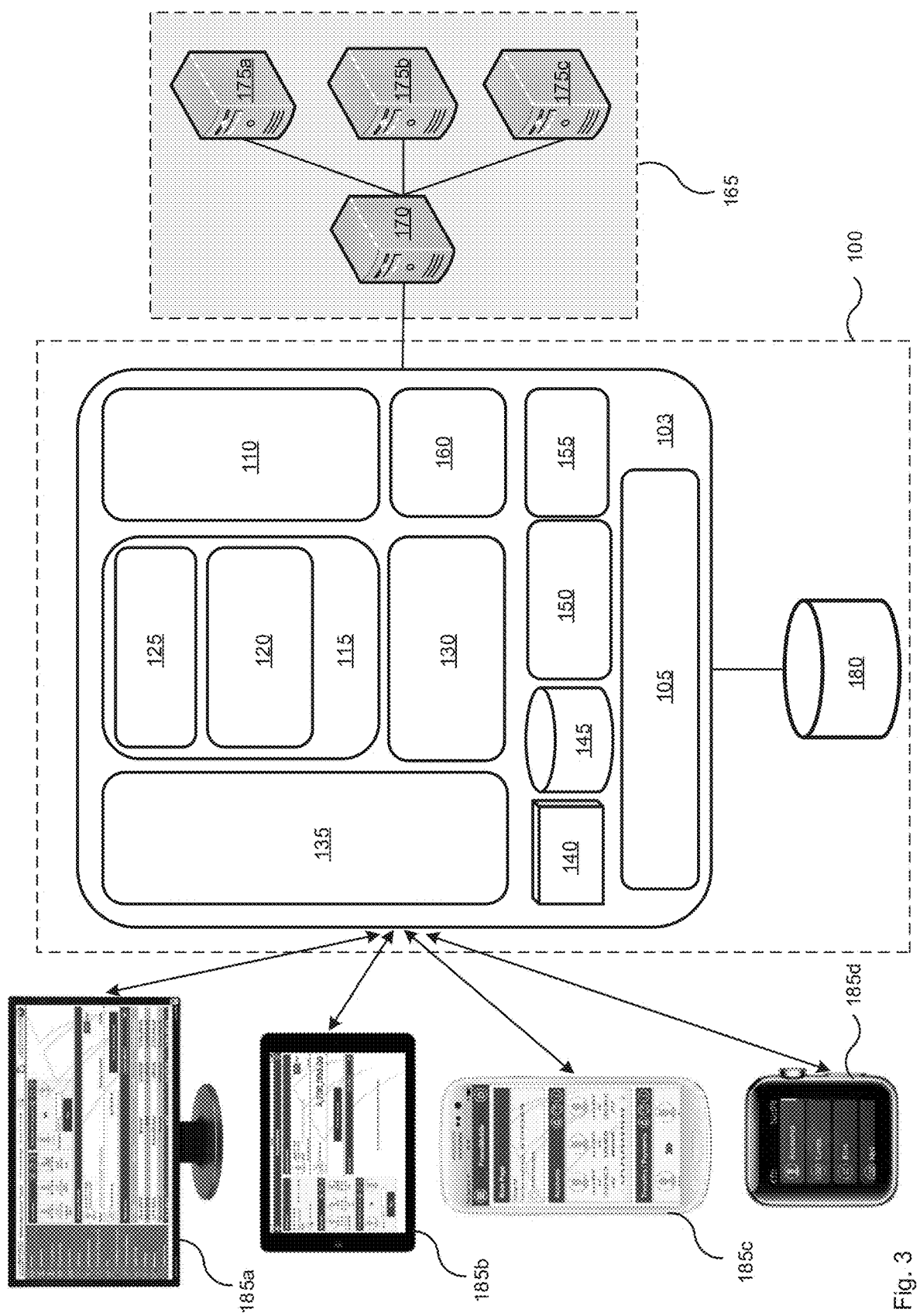
FIG. 3 shows a schematic system diagram of a system for providing a multi-channel electronic communication capability, according to non-limiting implementations.

FIG. 3 shows a schematic of an exemplary implementation of a system 100 for providing multi-channel electronic communication capability between a provider 165 and exemplary end user terminals 185a, 185b, 185c, and 185d (hereinafter collectively referred to as 185a-d). System 100 can comprise a communication management engine 103 which can comprise a number of subcomponents including a layout editor engine 105. In some implementations, communication management engine 103 can be colloquially termed Customer Experience and Engagement Platform. Communication management engine 103 can also comprise a channel manager 110, a touchtop portal 115 comprising a widget management engine 120 and a smart HTML5 client 125, an e-messaging engine 130, a provider solution engine 135, a reporting engine 140, an auditing and logging engine 145, an administration and control engine 150, an e-monitoring engine 155, and a work flow engine 160.

System 100 can also comprise a repository 180 of mini applications. These mini applications can also colloquially be termed widgets or be referred to by the distinctive term "widget5". Repository 180 can be connected to communication management engine 103. In some implementations, repository 180 can be in communication directly with layout editor engine 105.

Provider 165 can an IT infrastructure comprising servers 175a, 175b, and 175c (hereinafter collectively referred to as 175a-c) to provide the data that is to be presented to end users through user terminals 185a-d. In some implementations, servers 175a-c can be in communication with communication management engine 103 through a load balancer 170. While FIG. 3 shows only three servers 175a-c, it is contemplated that provider 165 can run one, two, four, or any other number of servers. It is also contemplated that these provider servers can connect directly to communication management engine 103 without going through a load balancer.

Figure 4:
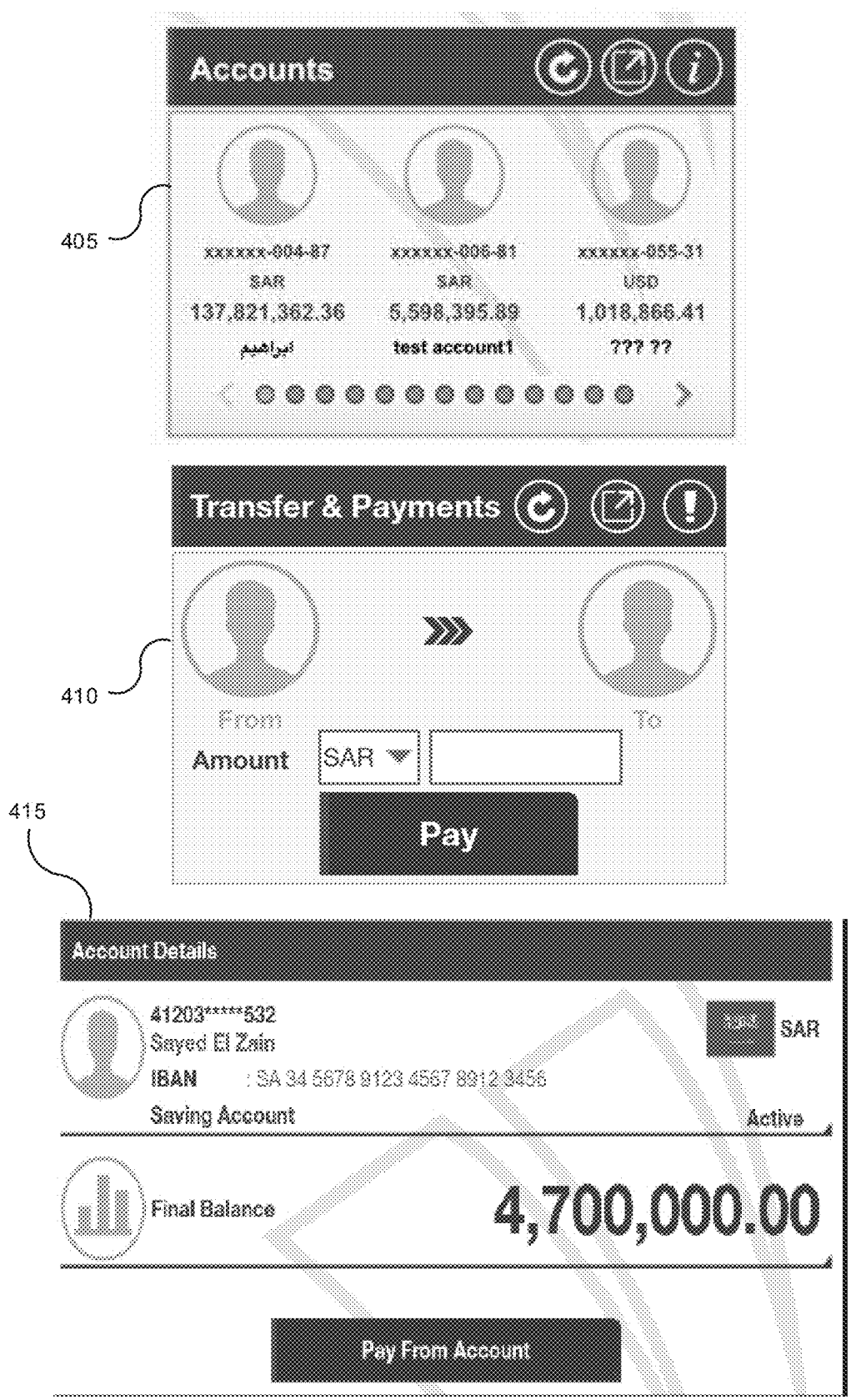
FIG. 4 shows screen shots of different mini applications, according to non-limiting implementations.

FIG. 4 shows an exemplary selection of mini applications including accounts mini application 405, transfer and payment mini application 410, and account details mini application 415. Other types of mini applications are also contemplated, and can be tailored for the provider's specific business which can include, but is not limited to, insurance, securities trading, banking, etc. The mini applications can comprise HTML5 markup, CSS Style Sheets, and Java Script code, which constitute the commonly supported technology between the plurality of different terminal platforms. This can allow the mini applications to be executable on most or all of the plurality of the terminal platforms.

HTML5 markup and the CSS Style Sheets can control the appearance of the mini applications, and the Java Script code can control the logic and/or the function of the mini applications. For each given mini application, the Java Script code can be the same for all terminal platforms on which the mini application is executable. The Java Script code for each mini application can be based on the requirements of each provider; for example, on the type of business of the provider. The HTML5 markup and/or the CSS Style Sheets, on the other hand, can be edited to optimize the appearance of each mini application for each terminal platform. Moreover, the HTML5 markup can comprise field tags configured to be placeholders for data receivable from the servers of the provider.

For example, in the case of transfer and payments mini application 410, HTML5 markup and/or CSS Style Sheets can control the appearance of the mini application including, but not limited to, the aspect ratio of the graphical user interface (GUI) presented by the mini application, the relative position of the icons presented to the GUI, etc. The Java Script code can control the function and/or logic of the mini application 410, including but not limited to the function of receiving input regarding transferor, transferee, transfer amount selection, and instructions to "pay" and effecting the transfer based on the received input.

It is also contemplated that repository 180 can comprise different types of mini applications including basic static content mini applications, connected mini applications, and higher level mini applications. Basic static content mini applications can be used to show marketing or otherwise static content. Connected mini applications can be configured to automatically make secure calls to the channel manager 110 and can be used to obtain dynamic business data from the provider's systems. Higher level mini applications can include pre-configured mini applications that are able to handle pre-built business or marketing functions and can only require the provider to configure them. Some examples of higher level mini applications include mapping mini applications, teaser mini applications, and the like.

Figure 5:
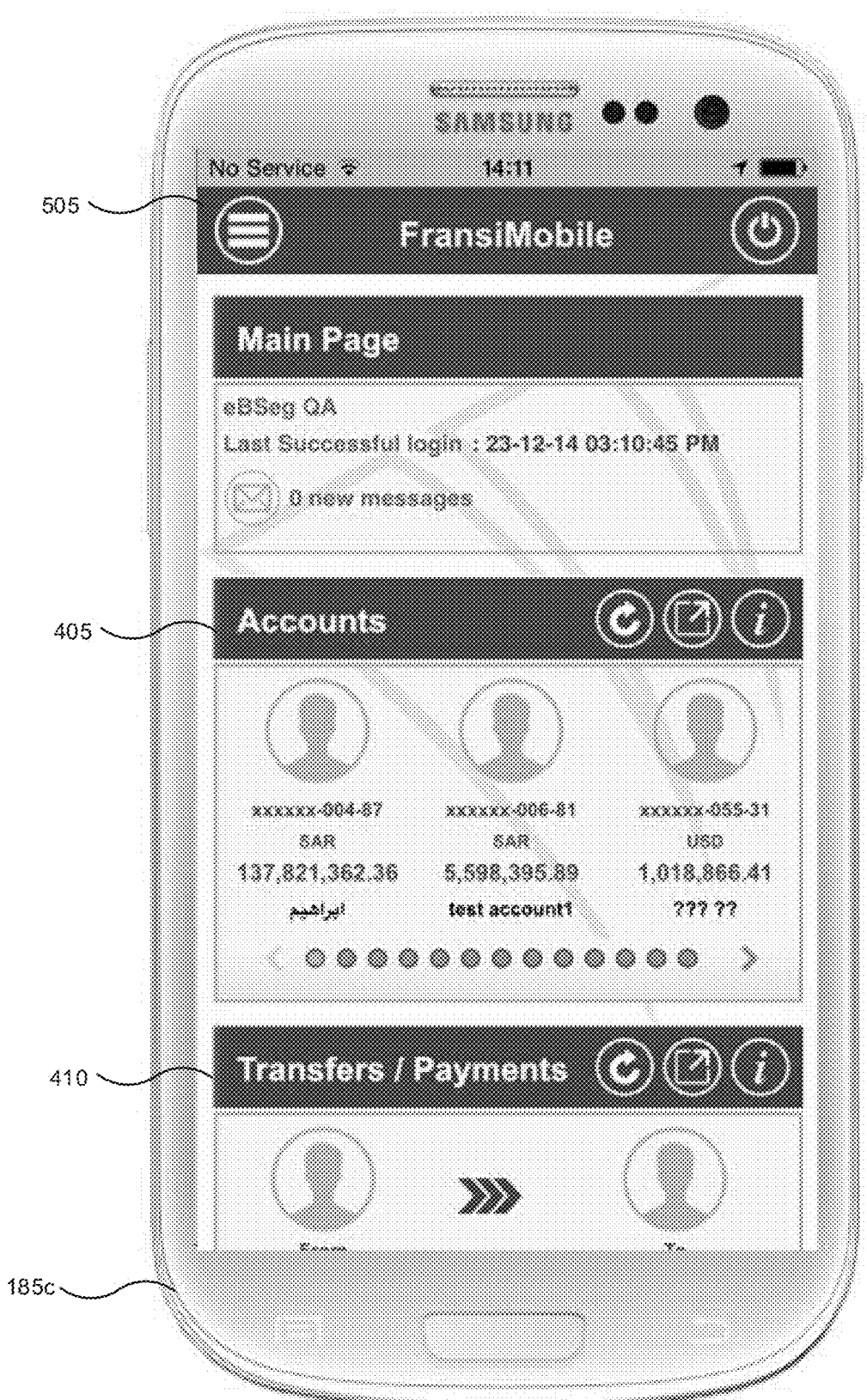
FIG. 5 shows a screen shot example of a communication interface for a smartphone, according to non-limiting implementations.

FIG. 5 shows a communication interface 505 for a smartphone end user terminal 185c running an Android™ operating system. Communication interface 505 comprises accounts mini application 405 and transfer and payment mini application 410, arranged in a columnar layout one on top of the other.

Figure 6:
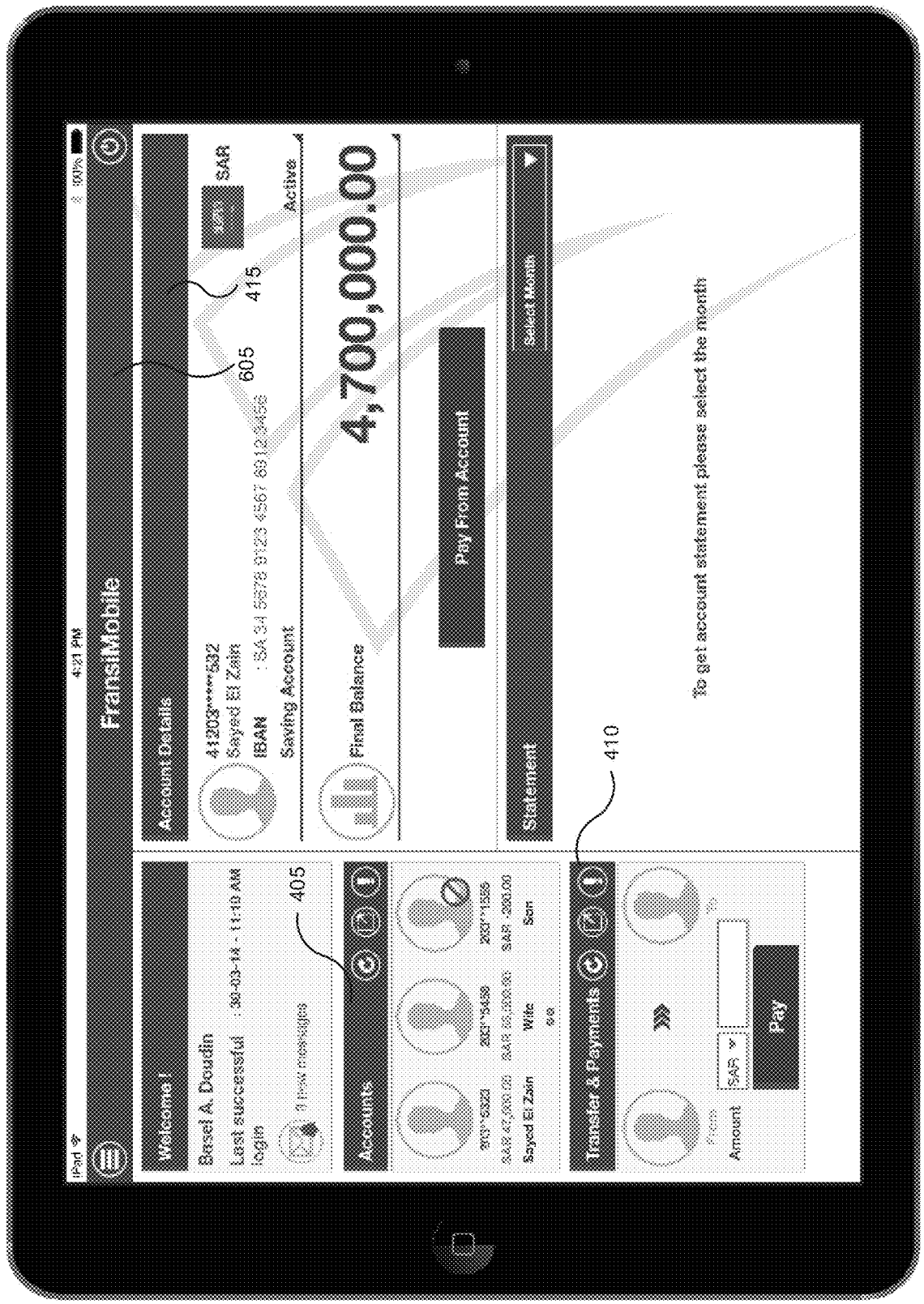
FIG. 6 shows a screen shot example of a communication interface for a tablet, according to non-limiting implementations.

FIG. 6 shows a communication interface 605 for an iPad™ tablet end user terminal 185b running an Apple™ iOS operating system, Communication interface 605 comprises a side bar along the left edge of the screen and a main column to the right of the side bar. The side bar comprises accounts mini application 405 and transfer and payments mini application 410. The main column comprises account details mini application 415. Communication interface 605 comprises an arrangement and/or layout of mini applications that is different from communication interface 505. In communication interface 605, the appearance of the mini applications and their arrangement/layout has been selected by the provider to be suitable and/or optimal for the input and output terminals of the tablet, e.g. for the dimensions of the screen.

Figure 7:
FIG. 7 shows a screen shot example of a communication interface for a browser of a desktop computer, according to non-limiting implementations.

FIG. 7 shows a communication interface 705 for a desktop computer end user terminal 185a running a web browser on a Windows™ operating system. Communication interface 705 comprises a side bar along the left edge of the screen and a main column to the right of the side bar. The main column is divided into rows. Accounts mini application 405 and transfer and payments mini application 410 are arranged side-by-side in the top row of the main column. Account details mini application 415 is arranged in the second row of the main column. In addition, the aspect ratio of the GUI of the account details mini application 415 has been extended horizontally to span the full width of the main column. As in the case of communication interfaces 505 and 605, in communication interface 705 the appearance of the mini applications themselves (e.g. aspect ratio of GUI of the account details application 415) and the layout of the mini application has been selected by the provider to be suitable and/or optimal for the communication platform.

Figure 8:
FIG. 8 shows a screen shot example of a communication interface for a smart watch, according to non-limiting implementations.

FIG. 8 shows a communication interface 805 for a smart watch end user terminal 185d running an Apple™ operating system. Communication interface 805 comprises abbreviated GUIs/graphical icons for different mini applications including accounts mini application 405, which abbreviated GUIs are arranged one on top of another to form a scrollable list. As can be seen in FIG. 8, the appearance of accounts mini application 405 has been changed (compared to FIGS. 5-7) and/or selected by the provider to optimize accounts mini application 405 and generally communication interface 805 for the smart watch terminal platform.

As can be seen from FIGS. 5-8, by changing the HTML5 markup and the CSS Style Sheets of the mini applications, their appearance can be altered and optimized for each different terminal platform without the need to alter the Java Script code that controls the function of each mini application. The layout and/or arrangement of the mini applications in each communication interface can be edited using layout editor engine 105.

Layout editor engine 105 can be WYSIWYG, in the sense that the changes made during the editing and/or arranging process will be reflected in the finalized communication interface such that the appearance of the communication interface at any given point during the editing process is reflective of the appearance of the finalized communication interface if the editing were to be concluded and the communication interface were to be finalized at that point.

When building each communication interface, a provider can use layout editor engine 105 to select one or more mini application from repository 180 for inclusion in the communication interface. Next, the provider can arrange the layout of the selection mini applications to build the communication interface. As discussed above, this arranging can be done in a WYSIWYG manner.

Building each communication interface can also comprise editing one or more of the appearance and the function of one or more of the selected mini applications. This editing can in turn be used to optimize the communication interface for specifications of each corresponding terminal platform. Such specifications can include, but are not limited to, a screen size of the corresponding end user terminal and/or types of input and/or output interfaces of the corresponding end user terminal. This capability of optimizing the communication interfaces for their respective terminal platforms can allow the systems and methods of the present specification to provide an opti-channel electronic communication capability.

The editing of the appearance and/or the function of the selected mini applications can also be done using layout editor engine 105, or using a different component such as another component of system 100. When function of the mini applications is to be edited, layout editor engine 105 can allow a provider to change the logic and/or the function of the mini applications using WYSIWYG editing.

As discussed above, the same WYSIWYG editing facility can be used to change the appearance of the mini applications by changing the HTML5 markup and/or the CSS Style Sheets. In addition, in some implementations, layout editor engine 105 can also allow the provider to manage content objects in the communication interface such as menus, banners, and tabs. Layout editor engine 105 can also allow the provider to create new pages (of the communication interface) that are composed of a groups of mini applications and to connect them with a selector object such as menus or tabs by which the end user is able to access these new pages. Layout editor engine 105 can also be used as a content editor.

Referring now to FIG. 3, while this FIG. shows layout editor engine 105 as being a separate component of communication management engine 103, it is contemplated that layout editor engine can be a part of another component of communication management engine 103 such as touchtop portal 115, or any other component of communication management engine 103.

Moreover, while FIG. 3 shows layout editor engine 105 as being a part of communication management engine 103, it is contemplated that layout editor engine 105 can be a component separate from (or a software module stored and/or executed separately from) communication management engine 103. Such a separate layout editor engine 105 can be in communication with repository 180, but need not necessarily be in communication with end user terminals 185a-e and/or with provider servers 175a-c or provider load balancer 170.

When communication interfaces are built for different interfaces, the communication interfaces can be distributed as downloadable files, or apps, from an app store or another website. In some implementations, these communication interfaces can be preloaded on end user terminals or can be automatically sent to and/or installed on the end user terminals if the provider has an existing relationship with the end users.

These mini applications are configured to be stored and executed on the end user terminals. Once installed on the end user terminals (as part of the communication interface), these mini applications are configured to send data to and/or receive data from servers 175a-c of provider 165. This communication can be managed and mediated through channel manager 110, as will be discussed in greater detail below.

In the discussion herein of multi-channel and/or omni-channel electronic communication capability, the "channels" being referred to are those that correspond to terminal platforms which support the underlying technology of the mini applications and the communication interfaces. For example, for mini applications that are based on HTML5 markup and Java Script code, "channels" refers to the subset of all channels that correspond to terminal platforms that support HTML5 and Java Script. "Multi-channel" then refers to the capability to communicate with and/or through a plurality of channels/platforms in this subset of channels, whereas "omni-channel" refers to the capability to communicate with and/or through all of the channels/platforms in the subset of channels.

Examples of some of the terminal platforms that support HTML5 markup and Java Script code include, but are not limited to, terminal platforms corresponding to web browsers, smartphones, tablets, wearable electronics, social media platforms including mobile apps, automatic teller machines (ATMs), and electronic kiosks.

In addition to the features discussed above, in some implementations the communication interface can comprise an interface editor whereby the end user terminal can receive an input via the interface editor to modify one or more of: a selection of the mini applications appearing in the communication interface, a layout of the mini applications in the communication interface, and the appearance of one or more of the mini applications in the communication interface.

This interface editor can also comprise a WYSIWYG editing facility whereby the end user can visually edit the communication interface. This editing can take place on the end user terminal. The end user can also edit the appearance of the mini applications to optimize their user experience. For example, a farsighted end user can increase the font size and/or the size of icons appearing on the GUI of the mini application. As another example, a user who often uses his/her end user terminal in bright, outdoor environments can change the color scheme and contrast of the mini applications' GUI and/or the communication interface to make their content more clearly visible.

The mini applications can comprise additional capabilities in their logic and/or programming that can make it simpler for a user to perform the function and/or task that he/she wants to accomplish. In the conventional approach, the user must choose what action to perform, the means for its performance, and then initiate and confirm the performance of that function by the selected means. For example, when seeking to transfer funds in the banking context, the user needs to decide that they want to transfer a given amount of funds to a recipient, then the user must decide what transfer method to use (e.g. wire transfer, email money transfer, electronic bill payment, etc.), and then confirm the transfer.

To make the traditional approach more efficient from the end user's perspective, the mini applications can comprise internal logic, and have access to the necessary data, to choose the means for performing the desired action, without the user's having to specify the means. For example, referring again to the funds transfer example, the mini application can have access (from the provider's servers) to all the funds transfer means possible for transferring kinds to the recipient selected by the user. In some implementations, the mini application can also select and/or suggest the optimal (e.g. fastest, cheapest) means of transferring the funds. In this manner, the mini applications can modify the conventional approach by facilitating and/or eliminating the second step, i.e. the user specifying the means to perform the action.

The mini applications can be configured to define one or more objects and one or more actions executable in association with one or more of the objects, wherein the mini applications are configured to receive input to select the objects and the actions. In the exemplary context of a transactions mini applications (see e.g. FIG. 4, transfer and payment mini application 410), the object can comprise a funds recipient and the action can comprise transferring funds to the recipient. As discussed above, the mini application can be configured to automatically select a transaction method based on a selection of one or more of a transaction source and a transaction target and without requiring input from a user. The automatic selection can be based on one or more of the mini application's internal logic and the data from provider's servers.

This objects-and-actions approach can provide a more intuitive and efficient user interface than the conventional approach of selecting tasks, means, and confirmation. In addition, the objects-and-actions approach can be used in mini applications that can automatically select the means for performing a selected action enabling such mini applications to require a user to specify only the objects and actions for a selected task, but without requiring the user to select the means for performing that task.

In some implementations, the communication interface further comprises the functionality to cache at the end user terminal a subset of the information receivable at and/or through the communication interface running on that end user terminal. The subset (e.g. type and/or amount) of information cached can be selected by the provider when the provider is building the communication interface. The target of this caching can be to optimize the loading of this received data in offline mode without having to retrieve it from the provider's servers every time the data is requested.

Figure 1:
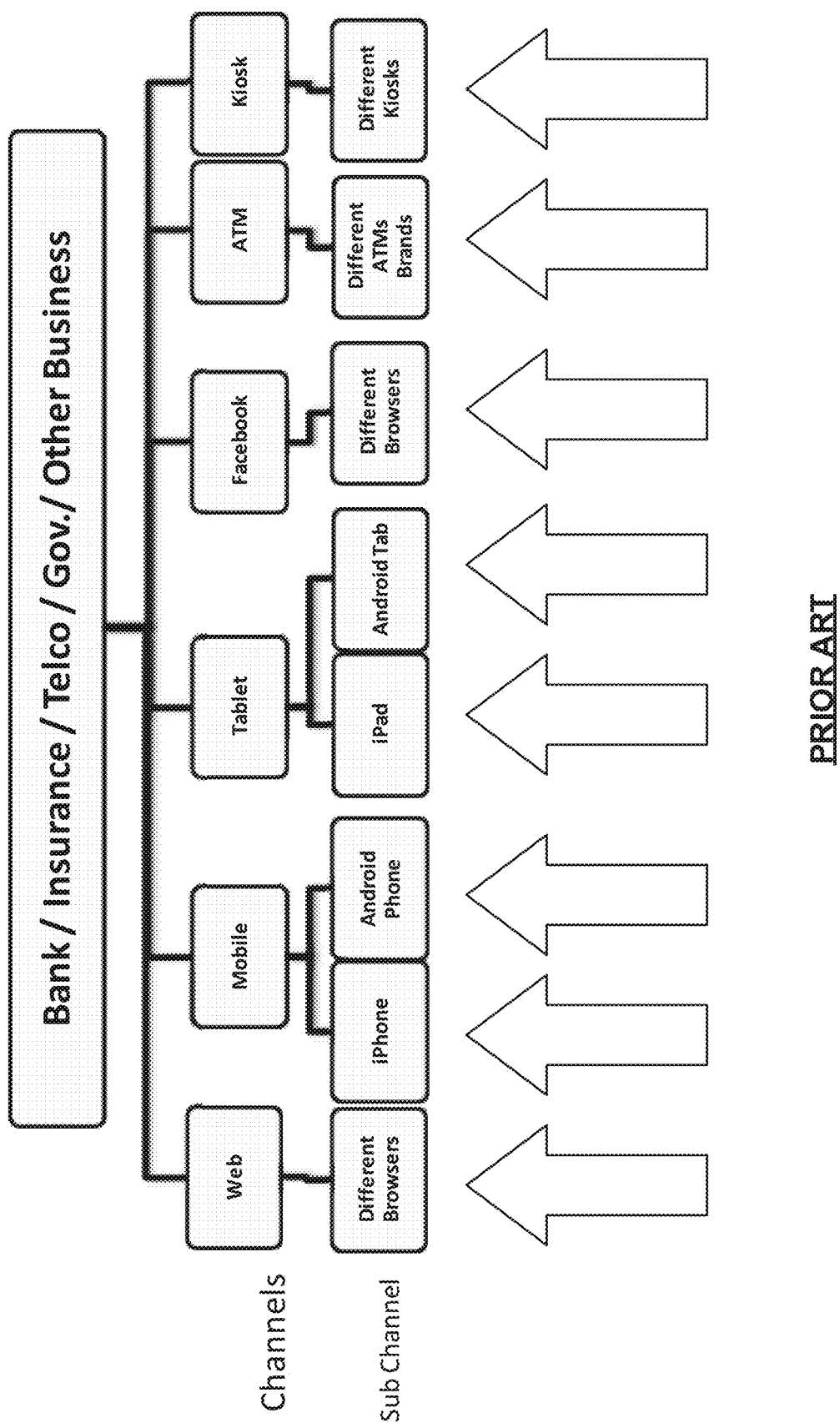
FIG. 1 shows a schematic representation of non-multi-channel communication through a set of communication channels.
Figure 9:
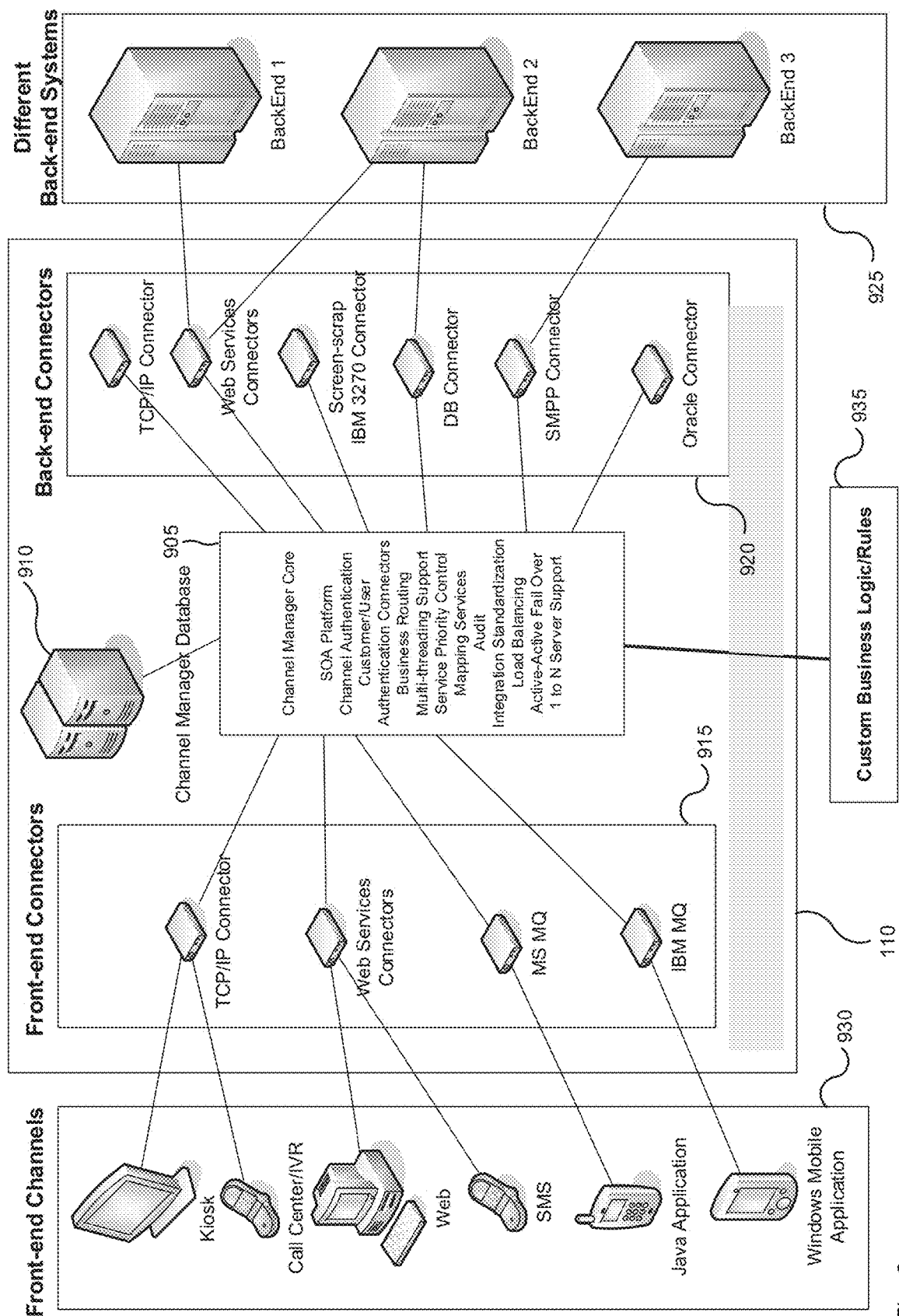
FIG. 9 shows a schematic system diagram depicting a channel manager, according to non-limiting implementations.

Referring now to FIG. 9, an exemplary implementation of channel manager 110 is shown. Channel manager 110 can be configured to route data messages between the communication interfaces running on the end user terminals and one or more servers of the provider. End user terminals are shown as terminals 185a-d in FIG. 1 and collectively as terminals 930 in FIG. 9. Servers of the provider are shown as servers 175a-c in FIG. 1 and collectively as servers 925 in FIG. 9. Channel manager 110 can connect to end user terminals 930 via front-end connectors 915, which can comprise, but are not limited to, TCP/IP Connectors, Web Services Connectors, MS MQ, and IBM MQ. Moreover, channel manager 110 can connect to provider's servers 925 via back-end connectors 920, which can comprise, but are not limited to, TCP/IP Connectors, Web Services Connectors, Screen-scrap IBM™ 3270 Connectors, DB Connectors, SMPP Connectors, and Oracle™ Connectors.

Channel manager 110 can also comprise a core 905 configured to perform routing of the data messages between end user terminals 930 and provider's servers 925. Core 905 can be connected to a channel manager database 910 and can apply custom business logic and/or rules 935 when performing the routing. While one particular implementation of channel manager 110 is shown in FIG. 9, it is contemplated that other configurations and implementations of the channel manager are also possible.

The data messages travelling between end user terminals 930 and provider servers 925 can be encrypted during a portion or the entirety of their transmission. These encrypted messages can comprise one or more of encrypted XML, and JSON messages. The encryption can be used to protect against hacking actions; for example, data messages can be signed using a key to enhance the data integrity. In addition, data messages can be assigned an identifier which can allow repeated transmission of encrypted messages to be detected, ignored, and/or reported as a security threat.

Referring back to FIG. 1, in some implementations, the data messages remain encrypted even partway inside the IT infrastructure of provider 165. For example, messages can remain encrypted through and past load balancer 170, and be decrypted only at servers 175a-c. This can reduce the exposure of unencrypted data messages to the security threats that can affect the internal IT infrastructure of the provider, such the load balancer.

In some implementations, one or more of channel manager 110 and the communication interface can further comprise an intelligent automatic updater configured to automatically update one or more of: one or more of the mini applications included in the communication interface, and the layout of the mini applications in the communication interface. In some implementations, the intelligent automatic updater can effect these updates without asking the end user to re-download any payload to get the new updates. This update process can be controlled through a publishing and version management process that is governed by a group of management user approvals based on permissions assigned.

Referring again to FIG. 1, communication management engine 103 is shown as having a number of components. It is also contemplated that these components can be implemented as separate hardware components or as software modules stored and/or executed at communication management engine 103 or separately from communication management engine 103. It is also contemplated that communication management engine 103 need not include all the components shown in FIG. 1, and in some implementations communication management engine 103 can comprise fewer components than or components different from those shown in FIG. 1. As discussed above, in some implementations, layout editor engine can be separate from communication management engine 103. In yet other implementations, layout editor engine 105 and repository 180 can be separate from system 100.

The above-described implementations are intended to be examples of the present invention and alterations and modifications may be effected thereto, by those of skill in the art, without departing from the scope of the invention which is defined solely by the claims appended hereto.

What is claimed is:

1. A method for providing omni-channel communication over multiple channels between a provider and a plurality of different end user terminals via respective communication interfaces, the end user terminals including one or more of web browsers, smartphones, tablets, wearable electronics, social media applications, automatic teller machines (ATMs), electronic kiosks, and other devices that support HTML5, the method comprising:

providing a repository of mini applications each executable on all of the plurality of end user terminals, wherein each of the multiple channels comprises a subset of all channels corresponding to end user terminals that support an underlying technology of the respective mini applications and communication interfaces;

editing one or more of function, appearance, and layout of the mini applications to optimize each communication interface for its respective end user terminal, thereby providing omni-channel communication through all channels of the respective subset; and building each respective communication interface by selecting and arranging the layout of one or more mini applications from the repository for inclusion in the respective communication interface, whereby the same mini applications are used to build, deploy and maintain communication interfaces for the different end user terminals; and routing data between at least one mini application on the plurality of different end user terminals and at least one server of the provider when according to custom business logic.

2. The method of claim 1, wherein the at least one mini application is further configured to operate on a plurality of end user terminals that support at least one of HTML5 or Java Script.

3. The method of claim 1, wherein at least one mini application is optimized for the communications interface by having logic stored within the mini application.

4. The method of claim 1, wherein the plurality of end user terminals conform to different specifications of screen size, different input and output interfaces, and operating system types.

5. The method of claim 1, wherein the at least one mini application can be a basic static content mini application, or a connected mini application configured to automatically make secure calls to the channel manager, or a higher level mini application.

6. The method of claim 1, wherein the at least one mini application comprises a transactions mini application.

7. The method of claim 6, wherein the transactions mini application is configured to automatically select a transaction method based on a selection of one or more of a transaction source and a transaction target without requiring input from a user.

8. The method of claim 7, wherein the at least one mini application comprises HTML5 markup, CSS Style Sheets and Java Script code.

9. The method of claim 8, wherein the HTML5 markup and the CSS Style Sheets control the appearance of the at least one mini application and the Java Script code controls the function of the at least one mini application.

10. The method of claim 8, wherein the HTML5 markup comprises field tags configured to be placeholders for data receivable by the at least one mini application from servers of the provider.

* * * * *